(12) United States Patent
Lee et al.

(10) Patent No.: US 9,348,280 B2
(45) Date of Patent: May 24, 2016

(54) HEATING COMPOSITE, AND HEATING APPARATUS AND FUSING APPARATUS INCLUDING THE SAME

(75) Inventors: Sang-Eui Lee, Hwaseong-si (KR); In-Taek Han, Seoul (KR); Yoon-Chul Son, Hwaseong-si (KR); Ha Jin Kim, Yongin-si (KR); Dong-Ouk Kim, Seoul (KR); Dong-Earn Kim, Seoul (KR); Kun Mo Chu, Yongin-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 415 days.

(21) Appl. No.: 13/475,404

(22) Filed: May 18, 2012

(65) Prior Publication Data

US 2012/0294659 A1 Nov. 22, 2012

(30) Foreign Application Priority Data

May 19, 2011 (KR) ........................ 10-2011-0047463

(51) Int. Cl.
*B32B 1/08* (2006.01)
*B32B 5/08* (2006.01)
*B32B 27/04* (2006.01)
*G03G 15/20* (2006.01)
*B82Y 30/00* (2011.01)
*C09K 5/14* (2006.01)
*B32B 27/08* (2006.01)

(52) U.S. Cl.
CPC ............ *G03G 15/2057* (2013.01); *B82Y 30/00* (2013.01); *C09K 5/14* (2013.01); *B32B 1/08* (2013.01); *B32B 5/08* (2013.01); *B32B 27/08* (2013.01); *G03G 15/2053* (2013.01); *Y10T 442/2984* (2015.04)

(58) Field of Classification Search
None
See application file for complete search history.

(56) References Cited

U.S. PATENT DOCUMENTS

| 6,063,463 A | 5/2000 | Schlueter, Jr. et al. |
| 6,122,479 A * | 9/2000 | Fujita et al. .................. 399/333 |
| 2008/0170982 A1* | 7/2008 | Zhang et al. ............... 423/447.3 |

FOREIGN PATENT DOCUMENTS

| JP | 2000-058228 A | 2/2000 |
| JP | 2007-272223 A | 10/2007 |
| KR | 20070079862 A | 8/2007 |
| KR | 10-2010-0007799 A | 1/2010 |
| KR | 20100045389 A | 5/2010 |
| KR | 20100093643 A | 8/2010 |

OTHER PUBLICATIONS

Zhang, M. et al., "Multifunctional Carbon Nanotube Yarns by Downsizing an Ancient Technology", Science, vol. 306, pp. 1358-1361, Nov. 19, 2004.
Zhang, M. et al., "Strong, Transparent, Multifunctional, Carbon Nanotube Sheets", Science, vol. 309, pp. 1215-1219, Aug. 19, 2005.
Fuhrer et al., "Crossed Nanotube Junctions," Science, vol. 288. Apr. 2000. www.sciencemag.org.

(Continued)

*Primary Examiner* — Ramsey Zacharia
(74) *Attorney, Agent, or Firm* — Harness, Dickey & Pierce, P.L.C.

(57) ABSTRACT

A heating composite, including a polymer matrix; and a carbon nanotube structure including a plurality of carbon nanotubes continuously connected to each other and integrated with the polymer matrix.

10 Claims, 8 Drawing Sheets

(56) References Cited

OTHER PUBLICATIONS

Buldum et al., "Contact Resistance Between Carbon Nanotubes," *Physical Review B*, vol. 63. Apr. 2001.

Vigolo et al., "Macroscopic Fibers and Ribbons of Oriented Carbon Nanotubes," *Science*, vol. 290. Nov. 2000. www.sciencemag.org.

Wang et at "Highly Oriented Carbon Nanotube Papers Made of Aligned Carbon Nanotubes," *Nanotechnology*, vol. 19. Jan. 2008. www.iopscience.iop.org.

Li et al., "Direct Spinning of Carbon Nanotube Fibers from Chenical Vapor Deposition Synthesis," *Science*, vol. 304. Apr. 2004. www.sciencemag.org.

\* cited by examiner

HEATING COMPOSITE, AND HEATING APPARATUS AND FUSING APPARATUS INCLUDING THE SAME

CROSS-REFERENCE TO RELATED APPLICATIONS

This application claims priority to Korean Patent Application No. 10-2011-0047463, filed on May 19, 2011, and all the benefits accruing therefrom under 35 U.S.C. §119, the content of which in its entirety is herein incorporated by reference.

BACKGROUND

1. Field

The present disclosure relates to a heating composite, and a heating apparatus and a fusing apparatus including the heating composite.

2. Description of the Related Art

In printing devices, such as laser printers, photocopiers, and the like, a printing method of transferring a toner, which is a fine solid powder, onto paper to display an image involves a series of relatively complex printing processes because it is difficult to spray a fine powder, unlike an ink. Thus currently a desired image is printed on paper in a process that includes electrification, exposure, development, transfer, and fusing processes.

In the fusing process, a toner is transferred onto paper by electrostatic attraction, and fixed by applying heat and pressure. Generally the fusing process is performed by a fusing apparatus which includes a pair of facing rollers, that is, a pressure roller and a heat roller. In the fusing process, a heating apparatus is heated by a heat source placed in the middle of the heating apparatus. The heat source can be a lamp, for example. Heat and pressure are applied to the toner while a paper, onto which the toner is transferred, is passed through a fusing nip.

It is difficult to provide a high heat transfer efficiency from this fusing apparatus because a heat source heats up a heat roller and this heat is transferred to the toner after the heat passes through a paper. In addition, the heat capacity of the heat roller is so high that the heat source is not suitable for increasing the temperature of the heat roller.

Accordingly, there remains a need for improved materials to provide an improved fusing process and fusing apparatus.

SUMMARY

Provided is a heating composite which has high electrical conductivity and may exhibit desirable heating characteristics.

Also provided is a heating apparatus for fusing which employs the heating composite.

Provided is a fusing apparatus for a printing apparatus which employs the heating apparatus.

Additional aspects will be set forth in part in the description which follows and, in part, will be apparent from the description.

According to an aspect, a heating composite includes a polymer matrix; and a carbon nanotube structure including a plurality of carbon nanotubes continuously connected to each other, wherein the carbon nanotube structure is integrated with the polymer matrix.

The carbon nanotube structure may include at least one selected from a carbon nanotube fiber, a carbon nanotube yarn, a carbon nanotube textile, and a carbon nanotube sheet, wherein the carbon nanotube textile may have a woven construction including at least one of the carbon nanotube fiber and the carbon nanotube yarn, and the carbon nanotube sheet may have a striped construction including at least one of the carbon nanotube fiber and the carbon nanotube yarn.

The carbon nanotubes may be bonded by van der Waals forces inside the carbon nanotube structure.

The carbon nanotube structure may further include a plurality of mechanically interlocked carbon nanotubes or a plurality of unzipped carbon nanotubes.

The polymer matrix may include at least one selected from a natural rubber, a synthetic rubber, a silicone rubber, a fluorosilicone, a fluoroelastomer, a polyphenylene sulfide, a polyamide-imide, a polyimide, a polyketone, a polyphthalamide, a polyether ether ketone, a polyethersulfone, a polyetherimide, and a polyaryletherketone.

The polymer matrix may further include at least one conductive filler selected form a carbon, a metal filler, and a metal oxide.

The polymer matrix may further include at least one conductive filler selected from carbon black, carbon nanotube, carbon nanofiber, carbon filament, graphite, graphene, iron, nickel, aluminum, silver, alumina, iron oxide, and the like.

The polymer matrix may further include at least one inorganic filler selected from calcium carbonate, magnesium carbonate, calcium sulfate, magnesium sulfate, iron oxide, zinc oxide, magnesium oxide, aluminum oxide, calcium oxide, titanium oxide, calcium hydroxide, magnesium hydroxide, aluminum hydroxide, fine crystal silica, fumed silica, natural zeolite, synthetic zeolite, bentonite, activated clay, talc, kaolin, mica, diatomite, and clay.

The heating composite may have a heat capacity per unit volume of about 0.9 joules per cubic meters kelvin ($J/cm^3$ K) or more.

According to another aspect, a heating apparatus for fusing includes a load support, wherein the load support is a roller or a belt; and a heating composite disposed on an outer surface of the load support, wherein the heating composite includes a polymer matrix; and a carbon nanotube structure including a plurality of carbon nanotubes continuously connected to each other and integrated with the polymer matrix.

The carbon nanotube structure may include at least one selected from a carbon nanotube fiber, a carbon nanotube yarn, a carbon nanotube textile, and a carbon nanotube sheet, wherein the carbon nanotube textile may have a woven construction including at least one selected from the carbon nanotube fiber and the carbon nanotube yarn, and the carbon nanotube sheet may have a striped construction including at least one selected from the carbon nanotube fiber and the carbon nanotube yarn.

The carbon nanotube structure may be a carbon nanotube linear structure including at least one selected from a carbon nanotube fiber and a carbon nanotube yarn, wherein the carbon nanotube linear structure may be wound around an outer surface of the load support.

According to an embodiment, a winding density of the carbon nanotube linear structure may vary in a direction of a rotation axis of the load support or in a direction of a rotation axis of a rotating body which drives the load support, wherein the winding density may be effective to control the local temperature distribution of the heating apparatus.

According to an embodiment, the carbon nanotube structure may be a carbon nanotube linear structure including at least one selected from a carbon nanotube fiber and a carbon nanotube yarn, wherein the carbon nanotube linear structure may be disposed parallel to a direction of a rotation axis of the load support or a direction of a rotation axis of a rotating body which drives the load support.

The carbon nanotube structure may be a carbon nanotube planar structure including at least one selected from a carbon nanotube textile and a carbon nanotube sheet, and wherein a plurality of the carbon nanotube planar structures may be stacked on each other. According to an embodiment, a total number of the stacks of the carbon nanotube planar structures may vary in a direction of a rotation axis of the load support or in a direction of a rotation axis of a rotating body which drives the load support, wherein the carbon nanotube planar structures may be effective to control the local temperature distribution of the heating apparatus.

The polymer matrix may include at least one selected from a natural rubber, a synthetic rubber, a silicone rubber, a fluorosilicone, a fluoroelastomer, a polyphenylene sulfide, a polyamide-imide, a polyimide, a polyketone, a polyphthalamide, a polyether ether ketone, a polyethersulfone, a polyetherimide, and a polyaryletherketone.

The polymer matrix may further include at least one conductive filler selected from carbon black, carbon nanotube, carbon nanofiber, carbon filament, graphite, graphene, iron, nickel, aluminum, silver, alumina, iron oxide, and the like.

The polymer matrix may further include at least one inorganic filler selected from calcium carbonate, magnesium carbonate, calcium sulfate, magnesium sulfate, iron oxide, zinc oxide, magnesium oxide, aluminum oxide, calcium oxide, titanium oxide, calcium hydroxide, magnesium hydroxide, aluminum hydroxide, fine crystal silica, fumed silica, natural zeolite, synthetic zeolite, bentonite, activated clay, talc, kaolin, mica, diatomite, and clay.

The heating apparatus may further include an insulating layer disposed between the load support and the heating composite.

The heating apparatus may further include a release layer disposed on an outermost surface of the heating apparatus.

The heating apparatus may heat a heated body disposed on an outer surface of the heating apparatus, wherein the heating apparatus and the heated body may be effective to fuse a toner onto a heated body.

According to another aspect, a fusing apparatus for a printing apparatus includes the heating apparatus for fusing disclosed above; and a pressurization apparatus facing a surface of the heating apparatus and contacting the surface of the heating apparatus to form a fusing nip, wherein the heating apparatus and the pressurization apparatus are effective to fuse a toner onto a heated body passing through the fusing nip.

According to yet another embodiment, a method of manufacturing a heating composite includes forming a carbon nanotube structure including a plurality of carbon nanotubes continuously connected to each other; integrating the carbon nanotube structure with a polymer matrix; and disposing the carbon nanotube structure on a load support to manufacture the heating composite.

Also disclosed is method of fusing a toner to a substrate, the method including contacting a toner and a heating apparatus including the heating composite of claim 1 to fuse the toner to a substrate

BRIEF DESCRIPTION OF THE DRAWINGS

These and/or other aspects, advantages and features of this disclosure will become more apparent and more readily appreciated from the following further description of the embodiments, taken in conjunction with the accompanying drawings in which.

DETAILED DESCRIPTION

Figure 1:
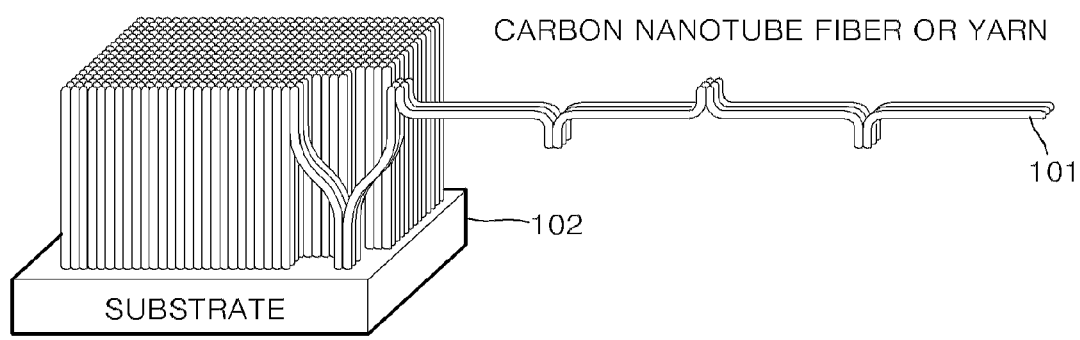
FIG. 1 is a schematic view illustrating an embodiment of a method of forming carbon nanotube fibers or yarns from a vertically grown carbon nanotube array.

This disclosure will be described more fully hereinafter with reference to the accompanying drawings, in which various embodiments are shown, wherein like reference numerals refer to like elements throughout. In this regard, the present embodiments may have different forms and should not be construed as being limited to the descriptions set forth herein. Accordingly, the embodiments are provided so that this disclosure will be thorough and complete, and will fully convey the scope of the invention to those skilled in the art. It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used here, the singular forms "a", "an" and "the" are intended to include the plural forms as well, unless the content clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A heating composite according to an embodiment is a resistance heating body in which heat may be directly generated from a surface of a fusing apparatus, unlike a commercially available device in which heat is generated by a halogen lamp, for example. In a fusing apparatus of a commercially available laser printer, heat is transferred to the surface of the fusing apparatus. The heating composite disclosed herein may minimize heat loss by heat transfer, and simultaneously provide a more rapid heating rate.

According to an embodiment, the heating composite includes a polymer matrix; and a carbon nanotube structure comprising a plurality of carbon nanotubes continuously connected to each other, wherein the carbon nanotube structure is integrated with (e.g., impregnated within) the polymer matrix.

Carbon nanotubes are excellent nano-materials having improved mechanical strength, thermal conductivity, and chemical stability. Carbon nanotubes have a heat capacity per unit volume of about 0.9 joules per cubic meters kelvin ($J/cm^3 \cdot K$), which is much lower than a heat capacity per unit volume of about 3.6 $J/cm^3 \cdot K$ of a different conductive filler material, e.g., stainless steel. Carbon nanotubes have better heating efficiency than other conductive filler materials because the heat conductivity of carbon nanotubes is very high, about 3,000 watts per meter kelvin ($W/m \cdot K$) or more.

According to an embodiment, a heating composite is a highly conductive composite material wherein a carbon nanotube structure with carbon nanotubes continuously connected to each other is integrated with (e.g., impregnated within) a polymer matrix. The heating composite may be a highly conductive composite material. In an embodiment, the carbon nanotube structure including a plurality of carbon nanotubes may comprise or consist of at least one selected from a carbon nanotube fiber, a carbon nanotube yarn, a carbon nanotube textile, and a carbon nanotube sheet, wherein each of the foregoing may comprise or consist of a plurality of carbon nanotubes.

Carbon nanotubes have at least one minor dimension, for example, a width or a diameter, of about 100 nanometers ("nm") or less. The term "nanotubes" refers to elongated structures of like dimensions, for example, nanoshafts, nanopillars, nanowires, nanorods, nanoneedles, and their various functionalized and derivatized fibril forms. The nanotubes may have various cross sectional shapes, such as a rectangular, polygonal, oval, elliptical, or circular shape. Any form of carbon nanotubes, such as a single-walled carbon nanotube, a double-walled carbon nanotube, a multi-walled carbon nanotube, a rope carbon nanotube, and the like may be used in a carbon nanotube strand, which is a minimum unit constituting the carbon nanotube structure. The different types of carbon nanotubes may be used alone or in a combination of one or more different types thereof as a mixture.

The carbon nanotubes may have any aspect ratio (length:diameter) effective for heat transfer as described below, for example from about 10,000 to about 1, or from about 5000 to about 1, or from about 1000 to about 1. Similarly, the diameter of the carbon nanotubes (including individual carbon nanotubes in a bundle), can be, for example, about 10 micrometers or less, specifically about 500 nanometers or less, more specifically about 100 nanometers or less. In addition, as the aspect ratio (length:diameter) of a carbon nanotube increases, a conductive network is easily formed inside a heating composite 313 and thus the carbon nanotube may have a large electrical conductivity at the same carbon nanotube loading. For example, when a carbon nanotube has a diameter of about 10 micrometers (μm) or less and an aspect ratio of about 5000:1 or more, a high electrical conductivity of the heating composite 313 may be provided.

The carbon nanotube structure may be formed by a dry process or a wet process. For example, carbon nanotubes may be vertically grown on a substrate, and then carbon nanotube fibers or sheets may be drawn through a drawing process or yarns may be formed by various methods.

FIG. 1 is a schematic view illustrating a method of forming carbon nanotube fibers or yarns from an array of vertically grown carbon nanotubes. The array of vertically grown carbon nanotubes may be on a substrate 102. The carbon nanotube fiber drawn from a carbon nanotube array is a one-dimensional linear structure in which a plurality of carbon nanotube ends are bonded to each other by van der Waals forces. These carbon nanotube fibers may be manufactured as a carbon nanotube yarn 101 using a spinning process. According to an embodiment, a plurality of carbon nanotubes may be combined by van der Waals forces to provide the carbon nanotube structure.

Figure 2A:
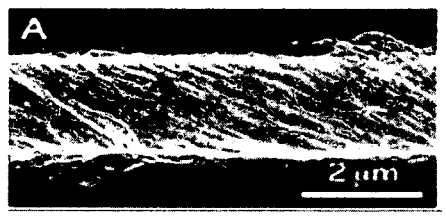
FIGS. 2A to 2E are Scanning Electron Microscopy ("SEM") photos illustrating various forms of carbon nanotube yarns disclosed in M. Zhang, et al., "Multifunctional Carbon Nanotube Yarns by Downsizing an Ancient Technology," Science, 306, 1358-1361 (2004), the content of which in its entirety is herein incorporated by reference.
Figure 2B:
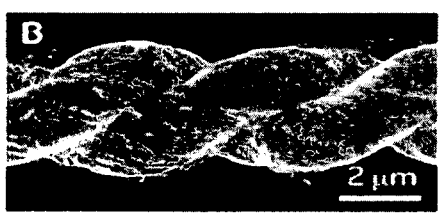
Figure 2C:
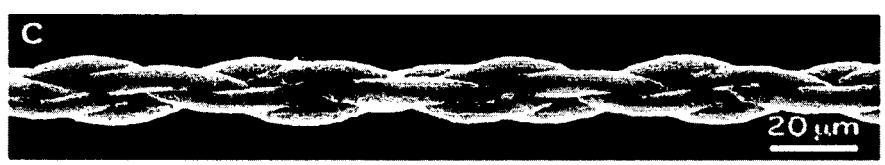
Figure 2D:
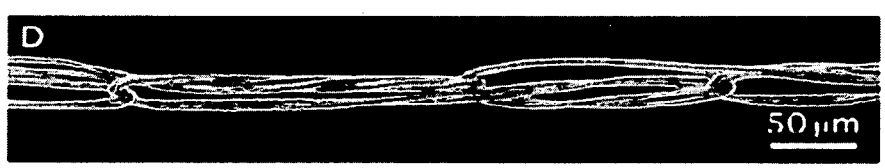
Figure 2E:
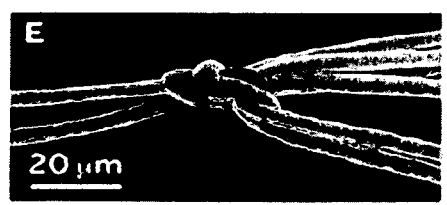

FIGS. 2A to 2E are Scanning Electron Microscopy ("SEM") photos illustrating various forms of carbon nanotube yarns disclosed in M. Zhang, et al., Science, 306, 1358 (2004)), illustrating various forms of multi-walled carbon nanotube fibers including single-ply Yarn as shown in FIG. 2A, two-ply Yarn as shown in FIG. 2B, four-ply Yarn as shown in FIG. 2C, knitted yarn as shown in FIG. 2D, and knotted Yarn as shown in FIG. 2E. These images show that carbon nanotubes may be diversely twisted or knitted. In addition, a carbon nanotube textile as a two-dimensional planar structure may be formed by weaving to provide a woven construction comprising at least one of the carbon nanotube fiber and the carbon nanotube yarn. As another example, a carbon nanotube sheet with a specific orientation may be manufactured by disposing least one of the carbon nanotube fiber and the carbon nanotube yarn in the form of stripes to provide a striped construction.

Figure 3A:
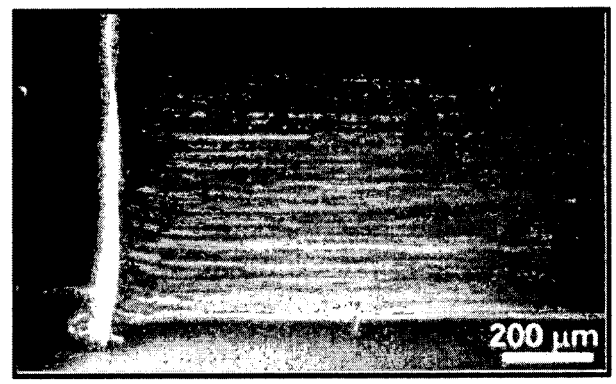
FIGS. 3A and 3B are SEM photos illustrating the formation of a carbon nanotube sheet from a carbon nanotube array and a combination thereof disclosed in M. Zhang et al., "Strong, Transparent, Multifunctional, Carbon Nanotube Sheets," Science, 309, 1215-1219 (2005), the content of which in its entirety is herein incorporated by reference.
Figure 3B:
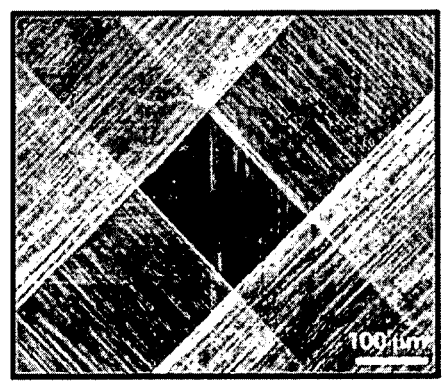

FIGS. 3A and 3B are SEM photos illustrating the formation of a carbon nanotube sheet from a carbon nanotube array and a combination thereof as disclosed in M. Zhang et al., Science, 309, 1215 (2005)). A carbon nanotube sheet may be manufactured by drawing carbon nanotube fibers or yarns substantially in parallel from a carbon nanotube array grown on a substrate, and a plurality of the carbon nanotube sheets may overlap in different directions.

Carbon nanotube strands, which constitute the carbon nanotube fiber, carbon nanotube yarn, carbon nanotube textile, and carbon nanotube sheets, may have their ends connected to each other along the fiber axis and may be arranged with a predetermined regularity, and thus, a conductive network may be effectively formed.

According to another embodiment, in addition to carbon nanotubes combined by van der Waals forces inside the carbon nanotube structure, the heating composite may further include a plurality of mechanically interlocked carbon nanotubes or a plurality of unzipped carbon nanotubes.

According to yet another embodiment, a fusing apparatus for a printing apparatus includes the carbon nanotube structure integrated with (e.g., impregnated within) a polymer matrix such that stable heating characteristics and reduced stress, which may be induced by a mechanical and thermal load generated during paper-feeding and printing, may be provided.

The polymer matrix is not particularly limited as long as the polymer matrix is a material having heat resistance with which the polymer matrix may effectively withstand the fusing temperature while supporting the carbon nanotube structure. For example, the polymer matrix may include at least one selected from a natural rubber; a synthetic rubber such as ethylene propylene diene monomer rubber, styrene butadiene rubber ("SBR"), butadiene rubber ("BR"), nitrile butadiene rubber ("NBR"), isoprene rubber, polyisobutylene rubber, and the like; a silicone rubber such as polydimethylsiloxane ("PDMS"), and the like; a fluorosilicone, a silicone resin, and a fluoroelastomer, and the like. Polymers with excellent heat resistance, such as a polyphenylene sulfide, a polyamideimide, a polyimide, a polyketone, a polyphthalamide, a polyether ether ketone, a polyethersulfone, a polyetherimide, and a polyaryletherketone, and the like, may be also used. For example, polymers with high heat resistance, such as silicone rubber or polyimide, generally used in fusing apparatuses, may be appropriate. The polymer matrix may be formed using one of these polymers, or a combination including at least one of the foregoing may be used.

According to an embodiment, in order to enhance the conductivity of the polymer matrix, the polymer matrix may further include at least one conductive filler selected from a carbon filler, such as carbon black, carbon nanotube, carbon nanofiber, carbon filament, graphite, graphene, and the like; a metal filler, such as iron, nickel, aluminum, silver, and the like; and a metal oxide filler, such as alumina, iron oxide, and the like. The conductive filler may be used alone or in combinations thereof. The conductive filler may be in the particle form.

According to an embodiment, the polymer matrix may further include an inorganic filler in order to enhance the heat resistance of the polymer matrix. According to an embodiment, the polymer matrix may further include at least one inorganic filler selected from calcium carbonate, magnesium carbonate, calcium sulfate, magnesium sulfate, iron oxide, zinc oxide, magnesium oxide, aluminum oxide, calcium oxide, titanium oxide, calcium hydroxide, magnesium hydroxide, aluminum hydroxide, fine crystal silica, fumed silica, natural zeolite, synthetic zeolite, bentonite, activated clay, talc, kaolin, mica, diatomite, and clay, and the like. The inorganic filler may be used alone, or a combination thereof may be used.

According to an embodiment, the polymer matrix may further include an additive, provided the heat generation effects of the heating composite are not undesirably affected. Examples of the additive may include an oxidation-resistant stabilizer (e.g., an antioxidant), a weather-resistant stabilizer, an antistatic agent, a dye, a pigment, a dispersing agent, a coupling agent, and the like. The foregoing may be added to the polymer matrix, if desired, in any amount so long as the desirable properties of the polymer matrix are not undesirably affected.

According to an embodiment, the heating composite may be manufactured by matrix impregnation (e.g., integrating) the carbon nanotube structure as described above in a polymer matrix without a dispersing process or an arranging process, and then removing the excess resin from the carbon nanotube structure. The carbon nanotube structure may be disposed on (e.g., coupled with) a support base or a load support. According to another embodiment, the heating composite may be manufactured by forming or transferring the carbon nanotube structure on a support base (or a load support) and then integrating (e.g., impregnating) the carbon nanotube structure within the polymer matrix. Thus a manufacturing process of the composite may be simplified.

In a commercially available carbon nanotube-polymer composite material, it is difficult for carbon nanotubes to be oriented in a specific orientation because carbon nanotubes are irregularly distributed within the polymer matrix. Although it is not easy to distribute carbon nanotubes at high loadings, a conductive network in the disclosed heating composite may be suitably formed, and thus carbon nanotubes may be uniformly distributed throughout the heating composite, and thus, a high electrical conductivity may be provided even at the same carbon nanotube loading. Accordingly, the heating composite may have a more rapid heating rate than a commercially available carbon nanotube-polymer composite material, and may provide more uniform heating characteristics.

Figure 4:
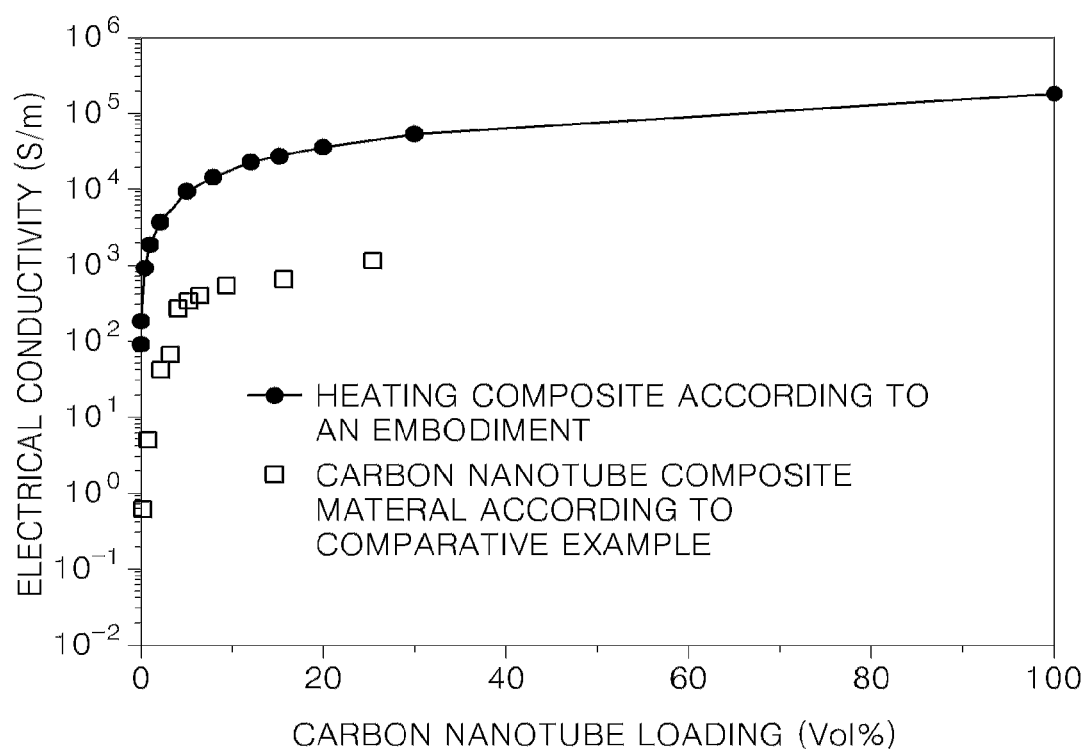
FIG. 4 is a graph of electrical conductivity (siemens per meter, S/m) versus carbon nanotube loading (volume percent, Vol %) which compares a maximum theoretical electrical conductivity that may be achieved by an embodiment of a heating composite with an experimental value of electrical conductivity of a carbon nanotube composite material according to a comparative example.

For example, FIG. 4 is a graph comparing a maximum theoretical electrical conductivity which may be achieved by the heating composite including a carbon nanotube composite according to an embodiment, with an experimental electrical conductivity of a carbon nanotube composite material oriented by a shearing force, according to a comparative example. Referring to FIG. 4, an electrical conductivity curve of a heating composite according to an embodiment shows theoretical electrical conductivity values according to carbon nanotube loadings when carbon nanotubes have a length of about 200 micrometers (μm,), a diameter of about 15 nanometers (nm), an electrical conductivity of about $10^5$ S/m, a contact resistance between the tubes of about 106 ohms (Ω), and are uniformly oriented. An electrical conductivity curve of a carbon nanotube composite material according to a comparative example shows experimental measurement values of a composite material in which the carbon nanotubes are distributed in a silicone rubber and then a shear flow is induced to partially orient the carbon nanotubes. As shown in FIG. 4, a carbon nanotube composite according to an embodiment may have a higher electrical conductivity than that of a composite material in which carbon nanotubes are randomly distributed in a polymer and oriented by shear flow according to the comparative example.

According to an embodiment, a carbon nanotube structure in the heating composite may be present in an amount of about 70% by weight or less. For example, a carbon nanotube structure may be present in an amount of about 10 to about 50% by weight, specifically about 15 to about 40% by weight, more specifically about 20 to about 35% by weight, based on a total weight of the heating composite.

The heating composite may have various heat capacities according to the carbon nanotube composite loading, a polymer or polymer matrix, or the volume of added inorganic materials other than carbon nanotubes. As a non-limiting example, the heating composite may have a heat capacity per unit volume of about 0.9 J/cm$^3$K or more, and the heat capacity of the heating composite may be selected addition of another filler, or the heat capacity of a polymer or polymer matrix, as mentioned above. For example, the heat capacity per unit volume may be in the range of about 0.9 to about 2.0 J/cm$^3$K, specifically about 1.0 to about 1.8 J/cm$^3$K, more specifically about 1.2 to about 1.5 J/cm$^3$K.

In addition, the winding density of a carbon nanotube linear structure or the total number of the stacks of a carbon nanotube planar structure may be varied to control a temperature distribution. In an embodiment, the winding density or the number of stacks of the carbon nanotube planar structure may be varied in a direction of a rotation axis of the load support or in a direction of a rotation axis of a rotating body which drives the load support, wherein the winding density and/or the carbon nanotube planar structure are effective to control local temperature distribution including local heating characteristics of a heating apparatus.

According to an embodiment, a heating apparatus for fusing includes the above-described heating composite including a load support, wherein the load support is a roller or a belt; and a heating composite disposed on an outer surface of the load support, wherein the heating composite includes a polymer matrix; and a carbon nanotube structure including a plurality of carbon nanotubes continuously connected to each other, wherein the carbon nanotube structure is integrated with (e.g., impregnated within) the polymer matrix.

Figure 5:
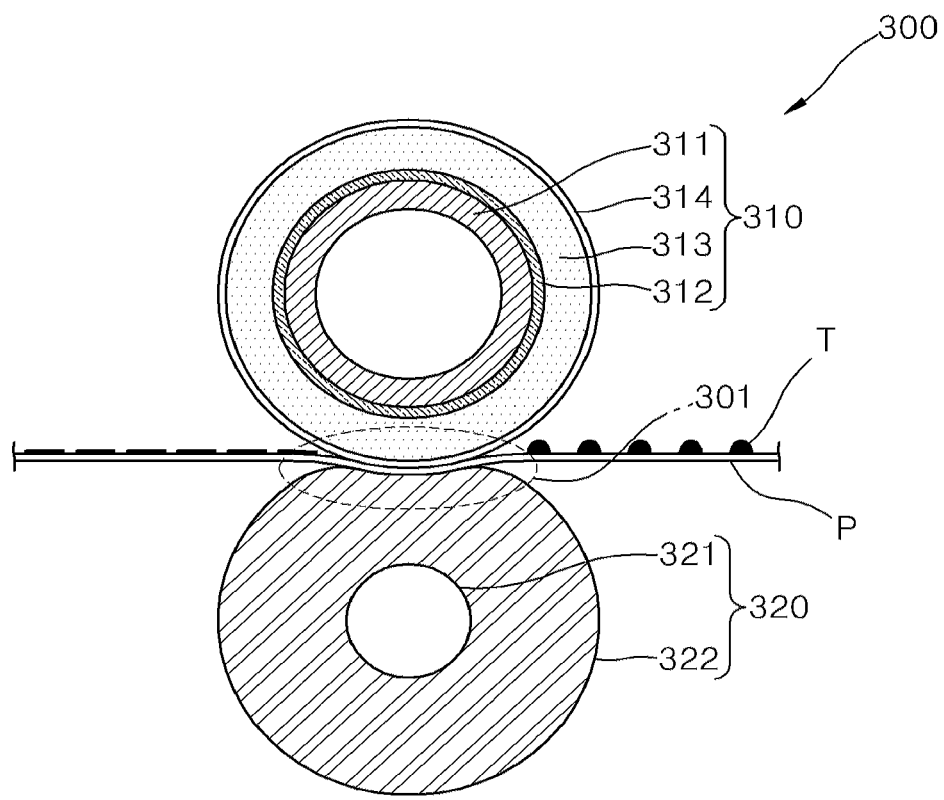
FIG. 5 is a schematic cross-sectional view of an embodiment of a fusing apparatus for a printing apparatus, including an embodiment of a heating apparatus for fusing.
Figure 6:
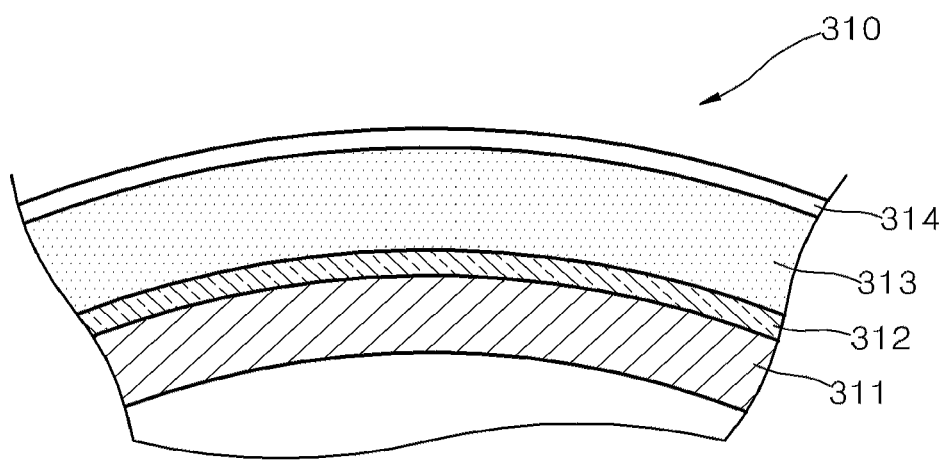
FIG. 6 is a partial cross-sectional view of an embodiment of a heating apparatus for fusing.

FIG. 5 is a schematic cross-sectional view of an embodiment of a fusing apparatus including a heating apparatus for fusing, and a pressurization apparatus. FIG. 6 is a more detailed, partial cross-sectional view of a portion of the heating apparatus 310 of the fusing apparatus 300 shown in FIG. 5. The fusing apparatus 300 may be used for a printing apparatus, such as a laser printer, and the like, and includes the heating apparatus 310 and a pressurization apparatus 320 engaged with (e.g., contacting a surface of) the heating apparatus 310 to form a fusing nip 301. The heating apparatus 310 may be a roller, as shown in FIG. 5. In addition, the pressurization apparatus 320 may be a roller including an elastic layer 322 formed around a load support 321. According to an embodiment, the load support may include a metal material. The heating apparatus 310 and the pressurization apparatus 320 are biased in a direction of engaging with each other by a bias means not shown, for example, a spring. The fusing nip 301, in which heat is transferred from the heating apparatus 310 to a paper (P), is formed by partially modifying the elastic layer 322 of the pressurization apparatus 320.

The heating apparatus 310 includes a load support 311 and a heating composite 313 disposed on an outer surface of the load support 311.

According to an embodiment, the load support 311 may include a metal material, for example, a metal hollow pipe may be employed as the load support 311, and the load support 311 may include a polymer material instead of or in addition to the metal material, without limitation, as long as the mechanical properties of the polymer material may be maintained at temperatures occurring in a fusing apparatus. For example, the polymer material may include a high-heat resistant plastic material having excellent mechanical properties at high temperatures, such as at least one polymer selected from a polyphenylene sulfide, a polyamide-imide, a polyimide, a polyketone, a polyphthalamide, a polyether ether ketone, a polyethersulfone, a polyetherimide, a polyaryletherketone, and the like.

An internal frame (not shown) may be disposed inside the load support 311 in order to press the heating apparatus 310 and the pressurization apparatus 320. While not wishing to be bound by theory, it is believed a material for the load support 311, which has excellent heat resistance and low heat transfer characteristics, is advantageous in that heat may be transferred through a toner T and paper P to improve the toner's fusing properties. The internal frame may also include, e.g., consist of, a material that does not efficiently absorb heat from a material for the load support 311.

The heating composite 313 which may be disposed on the outer surface of the load support 311 includes a polymer matrix and a carbon nanotube structure including a plurality of carbon nanotubes continuously connected to each other, wherein the carbon nanotube structure is integrated with (e.g., impregnated within) the polymer matrix. Since the heating composite 313 as described above is also applied here in the same manner, its detailed description will not be provided.

Figure 7:
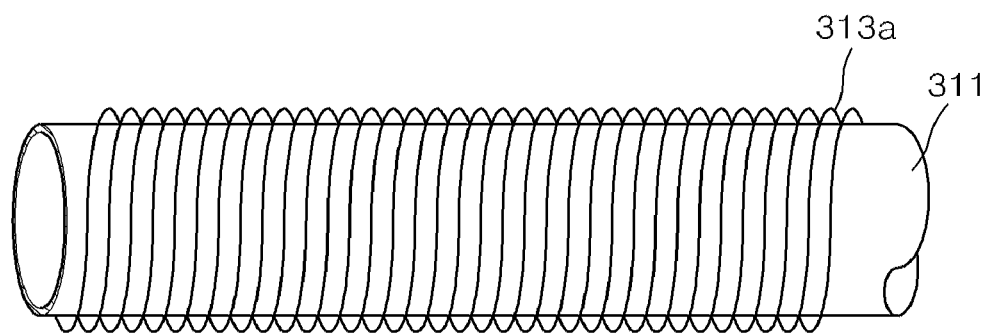
FIG. 7 is a schematic view illustrating an embodiment of a carbon nanotube linear structure which is wound around an outer surface of a load support in a heating apparatus for fusing.

According to an embodiment, the carbon nanotube structure may be a carbon nanotube linear structure comprising or consisting of at least one selected from a carbon nanotube fiber and a carbon nanotube yarn, wherein the carbon nanotube linear structure may be wound around an outer surface of a load support 311. As shown in FIG. 7, a carbon nanotube linear structure 313a may be spirally wound around an outer surface of a load support 311, and may be integrated with (e.g., impregnated within) a polymer matrix to form a heating composite 313. According to an embodiment, a winding density of the linear structure may vary, by modifying the number of windings, in a direction of a rotation axis of the load support 311 or in a direction of a rotation axis of a rotating body which drives the load support 311, and/or by performing the winding repeatedly, wherein the winding density may be effective to control the local temperature distribution of the heating apparatus. According to an embodiment, the winding density of the linear structure may be varied by performing the winding repeatedly.

According to an embodiment, a carbon nanotube linear structure may be disposed parallel to a direction of a rotation axis of a load support or in a direction of a rotation axis of a rotating body which drives the load support.

According to an embodiment, the carbon nanotube structure may be a carbon nanotube planar structure comprising or consisting of at least one selected from a carbon nanotube textile and a carbon nanotube sheet, wherein a plurality of the carbon nanotube planar structures may be stacked on each other. According to an embodiment, a total number of stacks of the carbon nanotube planar structures may vary in a direction of a rotation axis of the load support or in a direction of a rotation axis of a rotating body which drives the load support, wherein the carbon nanotube planar structures may be effective to control the local temperature distribution of the heating apparatus.

Figure 8:
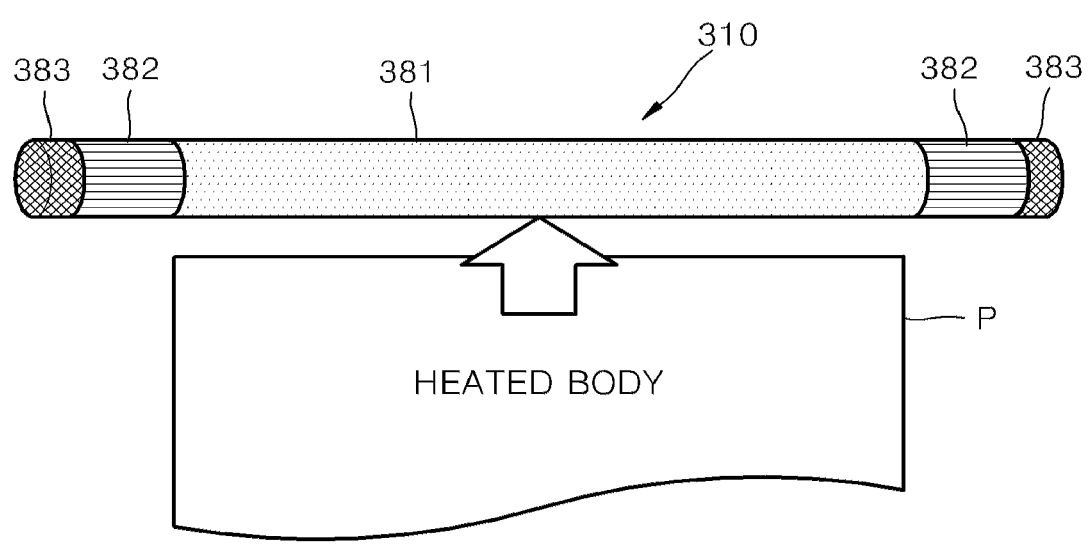
FIG. 8 is an embodiment of a structure in which heating characteristics are differently controlled for each region of a heating apparatus.

FIG. 8 is an example of a structure in which heating characteristics are differently controlled for each region of a heating apparatus according to an embodiment. Referring to FIG. 8, the printing region 381 region in a heating apparatus for fusing 310, which may be in the form of a roller, is a part into which a heated body (for example, a printing paper) is introduced. The heating apparatus may further comprise first and second non-printing regions 382 and 383, respectively. Electrodes may be formed in the second non-printing regions 383. While not wishing to be bound by theory, it is believed that increased heat generation may be provided by increasing the resistance of the printing region 381, and the first non-printing region 382. The increased resistance may reduce electric power consumption due to excess heat generation by decreasing the resistance of the region. When the resistances in the printing region 381 and the first non-printing region 382 are represented by $R_a$ and $R_b$, respectively, the temperature, $T_a$, in the printing region 381 may be higher than the temperature $T_b$ in the first non-printing region 382 if a winding density of or a total number of stacks of a carbon nanotube structure is varied to have a resistance distribution of $R_a > R_b$. In this way, a temperature distribution along a rotation axis in a linear or planar carbon nanotube structure may be more easily controlled.

According to an embodiment, an insulating layer 312 may be further disposed between the load support 311 and the heating composite 313 in order to reduce or prevent loss of heat generated from the heating composite 313 through the load support 311. The insulating layer 312 may be formed of any appropriate material, for example, at least one selected from a silicone rubber, a fluorosilicone, and a fluoroelastomer. Considering heat insulating characteristics, the insulating layer 312 may include a polymer in the form of sponge or foam. In addition, when heat conducting characteristics are desirable, the insulating layer 312 may be used in a state in which at least one conductive filler selected from a metal filler such as iron, nickel, aluminum, silver, and the like; a carbon filler such as carbon black, carbon short fiber, carbon filament, carbon coil, and the like; and metal oxide filler such as alumina, iron oxide, and the like, are added so long as the electrical conductivity of the heating composite is not undesirably increased.

When a polymer having insulating characteristics is used as a material for the load support 311, the heating composite 313 may be disposed directly on the load support, without the insulating layer 312 thereon. In this case, an elastic layer (not shown) may be disposed between the load support 311 and the heating composite 313 in order to enhance the elasticity.

An electrode (not shown) may be disposed inside the insulating layer 312. The insulating layer 312 may separate the load support 311 from the heating composite 313 and may separate the load support 311 from the electrode. According to an embodiment, an electrical current may be induced in the heating composite 313 by disposing an electrode on an outer surface of the insulating layer 312. When electric power is provided to the heating composite 313 by applying an electrical voltage to the electrode, the electric power provided is converted into heat in the heating composite 313 by a Joule effect.

A release layer 314 may be further disposed on an outermost surface of the heating apparatus 310. The release layer 314 is designed to facilitate separation of the paper (P), which passes through the fusing nip 301, from the heating apparatus 310 by preventing a toner melted by heat from adhering to the heating apparatus 310.

A surface of the paper (P) on which a toner image is adhered contacts the heating apparatus 310, and the other surface of the paper (P) is supported by the pressurization apparatus 320. When electric power is supplied to the heating composite layer 313, the temperature of the heating apparatus 310 is increased to a temperature effective for fusing, for example, about 100° C. to about 250° C., specifically about 125° C. to about 225° C., more specifically about 150° C. to about 200° C. The toner on the paper (P) is melted by heat of the heating composite layer 313, and the molten toner is pressed on the surface of the paper (P) by pressure imposed by the heating apparatus 310 and the pressurization apparatus 320, which are engaged (e.g., in contact) with each other. A toner image is fused on the paper (P).

A polymer having suitable release for a toner to be stably fused on a paper and prevent an offset from being produced when heat and pressure are applied to the toner may be used as a material for the release layer 314. For example, a material for the release layer may include a fluoropolymer, such as polytetrafluoroethylene ("PTFE"), e.g., Teflon™, and the like. The release layer 314 may further include a conductive filler, such as a metal filler, a carbon filler, a metal oxide filler, and the like, as mentioned above, in order to enhance the heat transfer. According to an embodiment, the release layer and may comprise any material which has excellent heat transfer characteristics and release characteristics.

Figure 9:
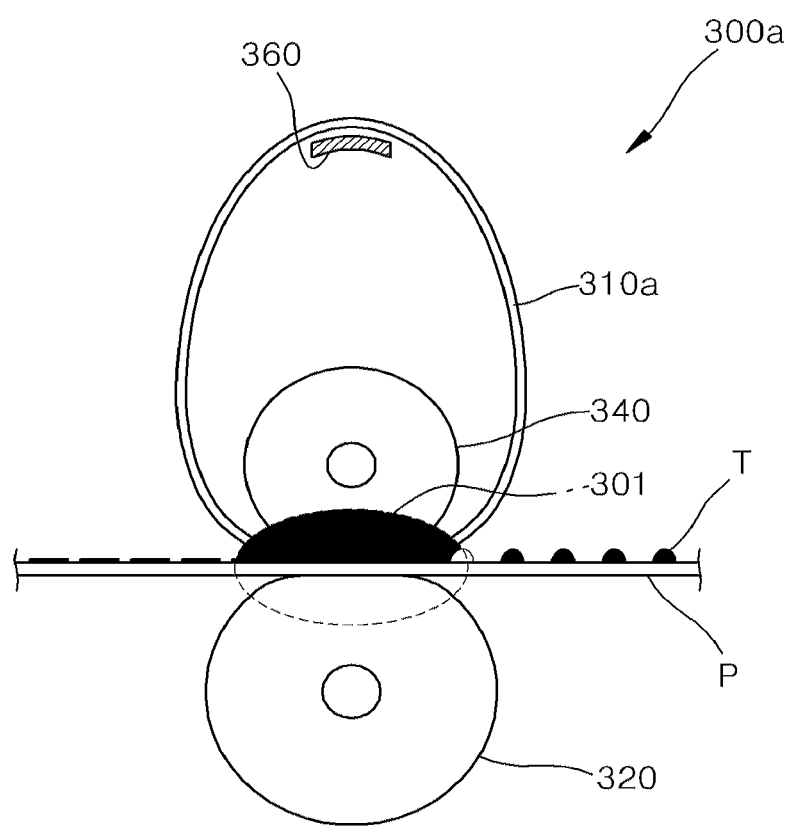
FIG. 9 is a schematic cross-sectional view of an embodiment of a fusing apparatus including a heating apparatus for fusing.

FIG. 9 is a schematic cross-sectional view of an embodiment of a fusing apparatus 300a including a heating apparatus for fusing, and a pressurization apparatus, according to another embodiment. The fusing apparatus 300a shown in FIG. 9 is different from the fusing apparatus 300 shown in FIG. 5 in that the fusing apparatus 300a employs the heating apparatus 310a including a load support, wherein the load support is a belt. Referring to FIG. 9, the heating apparatus 310a in the form of a belt, a pressurization apparatus 320 in the form of a roller, and a nip forming member 340 are shown. The nip forming member 340 is disposed on an inner surface of the heating apparatus 310a, which forms a closed loop, and serves as a rotating body which may drive the heating apparatus 310a. The pressurization apparatus 320 is disposed at an outer side of the heating apparatus 310a. In order to form a fusing nip 301, the nip forming member 340 and the pressurization apparatus 320 having the heating apparatus 310a therebetween are engaged with each other and rotated. A bias means (not shown) imparts elasticity to the nip forming member 340 and/or the pressurization apparatus 320 in the direction for the nip forming member 340 and the pressurization apparatus 320 to be engaged with each other.

The heating apparatus 310a, which corresponds to heating apparatus 310 in FIG. 6 has a structure in which the load support 311 is disposed on an inner surface of the belt and the heating composite 313 is disposed on an outer surface of the load support 311. The load support 311 may comprise a metal thin film, for example, a stainless steel thin film. In addition, the load support 311 may comprise any material without limitation as long as it is a polymer material with a high heat resistance and excellent strength. The thickness of the load support 311 may be selected to be flexible enough for the heating apparatus to flexibly modify the fusing nip 301 and recover its original state after the heating apparatus exits of the fusing nip 301. For example, the load support 311 may be formed of a stainless steel thin film with a thickness of about 35 micrometers. As the heating composite is described above, its detailed description will not be repeated for clarity.

As an example, the nip forming member 340 is an elastic roller, as shown in FIG. 9. The nip forming member may drive a heating apparatus 310a while being rotated with the pressurization apparatus 320. Since the heating apparatus 310a is driven by the nip forming member 340 and the pressurization apparatus 320, which are rotatably engaged with each other, slip between the heating apparatus 310a, the nip forming member 340, and the pressurization apparatus 320 is substantially or entirely prevented. Accordingly, the heating apparatus 310a may be stably driven.

The heating apparatus 310a may be driven in a tensionless state. For example, the heating apparatus 310a may be driven by the rotation of the nip forming member 340 and the pressurization apparatus 320, and an artificial tension all over the heating apparatus 310a may be absent. The belt guide 360 prevents the heating apparatus 310a from falling behind, and loosely supports the heating apparatus 310a in order not to impose tension on the heating apparatus 310. Furthermore, the belt guide 360 may be configured to effectively guide an end portion in a transverse direction of the heating apparatus 310a in order to prevent the heating apparatus 310a from being skewed.

Figure 10:
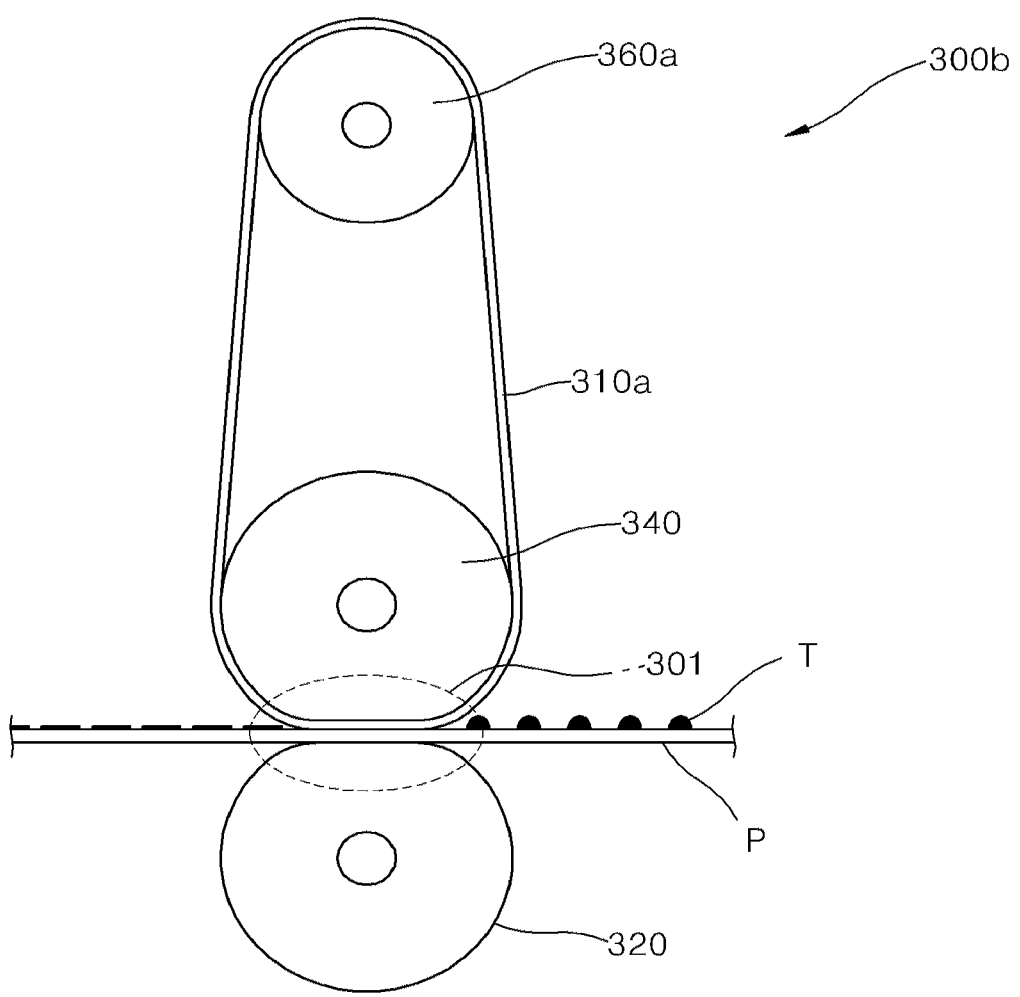
FIG. 10 is a schematic cross-sectional view of an embodiment of a fusing apparatus including a heating apparatus.

FIG. 10 is a schematic cross-sectional view of another embodiment of a fusing apparatus. Referring to FIG. 10, a fusing apparatus 300b includes the heating apparatus 310a in the form of a belt, which may be guided by a belt guide 360a to drive the heating apparatus 310a, while tension is being applied. The fusing apparatus 300b includes a pressurization apparatus 320. Also shown in FIG. 10 are a nip forming member 340, a fusing nip 301, and paper (P), which passes through the fusing nip 301 from the heating apparatus 310a.

In the above-described embodiments, the application of the heating apparatuses 310 and 310a to a fusing apparatus for a printing apparatus is described. However, the heating apparatuses 310 and 310a are not limited for use in a fusing apparatus, and may be used in various apparatuses which require a heat generation source which uses electricity to generate heat.

As exemplified by FIGS. 5, 9, and 10, a fusing apparatus for a printing apparatus includes a heating apparatus for fusing; and a pressurization apparatus facing a surface of the heating apparatus and contacting the surface of the heating apparatus, to form a fusing nip, wherein the heating apparatus and the pressurization apparatus may be effective to fuse a toner onto a heated body passing through the fusing nip.

The heating composite may be used to provide a heating apparatus for fusing to provide a high electrical conductivity, obtain a heating rate faster than that of a commercial resistance heating body, and provide stable heating characteristics for thermal and mechanical modification and load generated during paper-feeding and printing.

While this disclosure has been described with reference to embodiments illustrated in the drawings, it is only illustrative and it is to be understood that this disclosure is not limited to the disclosed embodiments, but, on the contrary, is intended to cover various modifications and equivalent arrangements included with the spirit and scope of the appended claims. Descriptions of features or aspects within each embodiment should generally be considered as available for other similar features or aspects in other embodiments.

What is claimed is:

1. A heating apparatus for fusing, the heating apparatus comprising:
   a load support, wherein the load support is a roller or a belt; and
   a heating composite disposed between the load support and a fusing surface, wherein the heating composite includes a polymer matrix, and
      a carbon nanotube structure including a plurality of carbon nanotubes continuously connected to each other, wherein the carbon nanotube structure is impregnated with the polymer matrix,
   wherein the carbon nanotube structure is a carbon nanotube linear structure including at least one of a carbon nanotube fiber and a carbon nanotube yarn, and the carbon nanotube structure is coil shaped and winds around an outer surface of the load support.

2. The apparatus of claim 1, wherein a winding density of the carbon nanotube linear structure varies in a direction of a rotation axis of the load support or in a direction of a rotation axis of a rotating body which drives the load support, wherein the winding density is effective to control the local temperature distribution of the heating apparatus.

3. The apparatus of claim 1,
   wherein the carbon nanotube linear structure is disposed parallel to a direction of a rotation axis of the load support or a direction of a rotation axis of a rotating body which drives the load support.

4. The apparatus of claim 1, wherein the polymer matrix comprises at least one selected from a natural rubber, a synthetic rubber, a silicone rubber, a fluorosilicone, a fluoroelastomer, a polyphenylene sulfide, a polyamide-imide, a polyimide, a polyketone, a polyphthalamide, a polyether ether ketone, a polyethersulfone, a polyetherimide, and a polyaryletherketone.

5. The apparatus of claim 1, wherein the polymer matrix further comprises at least one conductive filler selected from carbon black, carbon nanotube, carbon nanofiber, carbon filament, graphite, graphene, iron, nickel, aluminum, silver, alumina, and iron oxide.

6. The apparatus of claim 1, wherein the polymer matrix further comprises at least one inorganic filler selected from calcium carbonate, magnesium carbonate, calcium sulfate, magnesium sulfate, iron oxide, zinc oxide, magnesium oxide, aluminum oxide, calcium oxide, titanium oxide, calcium hydroxide, magnesium hydroxide, aluminum hydroxide, fine crystal silica, fumed silica, natural zeolite, synthetic zeolite, bentonite, activated clay, talc, kaolin, mica, diatomite, and clay.

7. The apparatus of claim 1, further comprising an insulating layer disposed between the load support and the heating composite.

8. The apparatus of claim 1, further comprising a release layer disposed on an outermost surface of the heating apparatus.

9. The apparatus of claim 1, wherein the heating apparatus heats a heated body disposed on an outer surface of the heating apparatus, wherein the heating apparatus and the heated body are effective to fuse a toner onto a heated body.

10. A fusing apparatus for a printing apparatus, the fusing apparatus comprising:
    the heating apparatus for fusing according to claim 1; and a pressurization apparatus facing a surface of the heating apparatus and contacting the surface of the heating apparatus to form a fusing nip,
wherein the heating apparatus and the pressurization apparatus are effective to fuse a toner onto a heated body passing through the fusing nip.

* * * * *